Patented Feb. 23, 1954

2,670,301

UNITED STATES PATENT OFFICE 2,670,301

REFRACTORY BODIES AND COMPOSITIONS AND METHODS FOR MAKING THE SAME

Kenneth C. Nicholson, Niagara Falls, N. Y., assignor to The Carborundum Company, Niagara Falls, N. Y., a corporation of Delaware No Drawing. Application July 17, 1951, Serial No. 237,384

18 Claims. (Cl. 106—57)

This invention relates to novel refractory compositions and to articles and shapes made therefrom. It also pertains to raw batches and methods for making the said compositions and articles. More particularly, it concerns bonded zirconium boride bodies and shapes and their manufacture.

There is a strong demand at the present time for new and better refractory compositions and shapes thereof which will stand up under the ever increasing and exacting demands required of them in respect of strength, hardness, resistance to oxidation and other forms of corrosion and erosion, resistance to thermal shock and other conditions bringing about deterioration and failure of more conventional refractory bodies.

It is an object of the present invention to provide new refractory compositions having highly satisfactory properties in many of the above respects and offering many advantages in various fields of use where a material or body of marked refractory properties and characteristics of hardness are required.

Fundamentally the refractory compositions or shapes of the present invention can be described as consisting essentially of zirconium boride which is bonded or held together in a surrounding interstitial matrix comprising oxidation compounds of zirconium and calcium. The zirconium boride of the final composition or shape can be obtained either by using zirconium boride which has been previously prepared together with the constituents of the bonding matrix or the zirconium boride can be formed from suitable raw materials in the course of the preparation of the final composition or article of the invention.

One method of making the bonded zirconium boride materials of the present invention wherein the zirconium boride is formed in the course of the making of the final composition utilizes a mixture of zirconium oxide, calcium boride and carbon as the raw materials which are suitably mixed together and the resulting mixture heated in an inert atmosphere, such as in an atmosphere of helium, to a temperature around 2000° C. to bring about the formation of zirconium boride and the development of the bonding matrix containing oxidized zirconium and calcium compounds. One way of carrying out the reaction is to place the materials in a covered zirconia crucible which is placed in a carbon tube resistance furnace and the temperature of the furnace raised to around 2000° C. to bring about the reaction of the ingredients. An inert atmosphere such as an atmosphere of helium is maintained in the furnace. An X-ray analysis of the resulting product shows the presence of zirconium boride in predominant amount together with zirconium oxide of cubic crystalline form. Chemical analysis further indicates the presence of calcium oxide which is believed to be in solid solution with the zirconium oxide in the matrix. The resulting material is crushed or pulverized to the desired degree of fineness and is used together with a small amount of temporary binder to mold articles of desired shape which are fired at temperatures in the neighborhood of 2000° to 2100° C. to produce a finished article of highly satisfactory refractory and physical properties.

A modification of the above method can be employed wherein calcium borate is used in place of the calcium boride in which case the amount of carbon used in the mixture is greater than that used when calcium boride is used since it is essential that a sufficient amount of carbon be present in the raw batch to provide for reduction of the borate.

Instead of making the compositions of the present invention as above described wherein the zirconium boride is formed in the process of making the final composition or shape, compositions or articles of the present invention can be made from a mixture of previously prepared zirconium boride together with the desired amount of previously prepared calcium zirconate. For example, highly satisfactory shapes have been made from a mixture of 75% by weight of 100 mesh and finer zirconium boride with 25% by weight of 200 mesh and finer calcium zirconate. The calcium zirconate, CaO·ZrO₂, is first made by heating together a mixture of 44.7% by weight of calcium carbonate and 55.3% by weight of zirconium oxide to a temperature of 1800° C. The resulting sintered product is then crushed to pass a 200 mesh sieve. A temporary binder, such as 1% of dextrine together with sufficient water to provide a moldable mix is admixed with the zirconium boride and calcium zirconate and the resulting mixture pressed in a steel mold. The pressed shape is dried and fired to a temperature of about 2000° C. in an inert atmosphere, such as in a stream of helium. The resulting shapes are hard and strong and when freshly broken present a silvery, metallic appearance. The final composition has been determined to be zirconium boride held together in an interstitial matrix of calcium zirconate.

The following specific examples illustrate more clearly the exact manner in which the present invention can be carried out, although the invention is not to be construed as being limited to the particular proportions set forth in the examples. The percentages given are percentages by weight.

Example I

| | Per cent |
|---|---|
| Calcium boride ($CaB_6$) 200 mesh and finer | 24.2 |
| Zirconium oxide | 69.3 |
| Powdered carbon | 6.5 |

The above mixture was placed in a covered zirconia crucible which was bedded in zirconia grog in a graphite boat which in turn was placed in a carbon tube resistance furnace. The crucible was of slip cast stabilized zirconia previously fired to 1400° C. After the furnace was loaded the temperature was raised to 2010° C. over a period of 2 hours, a stream of helium gas being continually passed through the furnace throughout the entire firing period.

The resulting material was dark gray in color and finely crystalline. The material was not attacked by cold concentrated hydrochloric acid and only slowly attacked by hot hydrochloric acid. When heated in air to 900° C. it remained hard and strong without undue oxidation taking place. After such an oxidizing heat treatment the material was still resistant to cold concentrated hydrochloric acid. The material underwent no decomposition in the presence of water, indicating that there was no calcium carbide present. X-ray examination showed the presence of both zirconium boride and zirconium oxide. Chemical analysis of the material indicated the presence of around 11% of calcium oxide. On the basis of the X-ray and chemical analyses of the material it was determined that the final product consisted of crystalline zirconium boride held together in a matrix comprising a solid solution of calcium oxide in zirconium oxide.

The calcium boride used in Example I was a material obtained from the Electro Metallurgical Company of Niagara Falls, New York, and had the following chemical analysis:

| | Per cent |
|---|---|
| Calcium | 27.25 |
| Boron | 38.62 |
| Silicon | .44 |
| Aluminum | .50 |
| Iron | .52 |
| Magnesium | .23 |
| Total carbon | 14.61 |

17% of the calcium boride material was unaccounted for by analysis; this percentage was presumed to be oxygen contained in the material.

The composition obtained in Example I was crushed to the desired degree of fineness whereupon it was used to mold articles of the desired shape. The resulting articles were fired at a temperature of 2000–2100° C. in an atmosphere of helium or other inert gas to provide finished shapes of highly refractory character, such as crucibles, nozzles, rocket lining segments and inserts, and the like. For example, a small nozzle approximately 1" in diameter and 1¼" in length and having a wall thickness of approximately 3/16" at the ends tapering to a wall thickness at the throat of 5/16" was made by grinding the above-described material to under 200 mesh particle size in an iron mortar and the resulting crushed material mixed with 2% of a 33% water solution of "Carbowax" No. 4000. The resulting mixture was pressed to the desired shape of the nozzle at 10,000 pounds per square inch and the molded article embedded in zirconia grog in a graphite boat and fired to 1820° C. in an atmosphere of helium in an induction furnace. "Carbowax" No. 4000 is the trade mark for a polyethylene glycol composition made by Carbide and Carbon Chemicals Corp., 30 E. 42nd St., New York 17, N. Y.

Test bars and other shapes having satisfactory properties and refractoriness, although not of as great a density as those made by first crushing the material as above described, have been made by molding the shaped article directly from the mixture of calcium boride, zirconia and carbon in the proportions set forth above in which case it is usually desirable to mold the resulting article at somewhat higher pressures. For example, shapes have been so made by mixing the materials with a small amount of temporary binder, such as "Carbowax" No. 4000 and molded at 30,000 pounds per square inch and fired under the conditions the same as those used when the article is made from the prefired and crushed material.

Example II

| | Per cent |
|---|---|
| Calcium borate | 36.9 |
| Zirconium oxide | 32.4 |
| Graphite powder | 20.7 |

The above mixture, which is similar to that used in Example I except for the replacement of the calcium boride by calcium borate and the use of an additional amount of carbon as required by the change from the boride to the borate, was fired under conditions the same as those used in Example I above. The resulting material did not have a metallic luster quite as bright as that shown by the material resulting from Example I, although X-ray and chemical analyses indicated that the material was, like that of Example I, predominantly zirconium boride in a matrix of zirconium oxide containing calcium oxide. The resulting material was crushed or pulverized to the desired degree of fineness and used to make refractory shapes by both cold molding and sintering and by hot pressing processes. For example, test bars were made by cold molding at pressures around 20,000 p. s. i. which had moduli of rupture of from 7500 p. s. i. to 8500 p. s. i. Denser bodies of greater strengths can be obtained when the shapes are made by hot pressing.

Example III

Satisfactory bonded zirconium boride nozzles have been made from the following mix:

| | Parts by weight |
|---|---|
| Zirconium boride, 100 mesh and finer | 75 |
| Calcium zirconate, 200 mesh and finer | 25 |
| Dextrine | 1 |

The calcium zirconate was first made by heating together a mixture of 44.7% by weight calcium carbonate and 55.3% by weight of zirconium oxide to a temperature of about 1800° C. The resulting sintered product was then crushed to pass through a 200 mesh sieve.

The above mixture of zirconium boride and calcium zirconate together with a temporary binder such as 1% of dextrine was moistened with sufficient water to give a moldable mixture which was then pressed in a steel mold at a pressure of 20,000 p. s. i. The pressed nozzle shape was dried to around 250° F. and fired to a temperature of 2000° C. in an inert atmosphere, for example in a stream of helium, in an Ajax high frequency induction furnace. The article was supported in the furnace on a stabilized zirconia batt. The resulting nozzle was hard and mechanically strong and highly resistant to oxidation at high temperatures. A freshly broken surface showed a silvery metallic luster. The final product consisted essentially of zirconium boride bonded by calcium zirconate.

*Example IV*

Nozzles and other shapes have been made from the composition of Example III above by a hot pressing technique wherein the material constituting the desired shape was placed in a suitable mold and placed in a furnace where it was heated to the required temperature while the material was under pressure. As the material was heated it was gradually compacted to the final shape. Articles so made by this hot pressing method were denser than shapes made from similar compositions by cold molding and sintering processes.

Articles made in accordance with the present invention may be molded by any of the well-known methods including pressure molding, machine tamping, hand tamping, jolting, vibrational tamping, air hammer flat or edge tamping, or slip casting.

It is to be understood that the products of the present invention in its various modifications are not limited to any specific field or fields of use such as might be defined by the specific examples previously set forth. The products can be made in any desired shape as well as provided in granular or aggregate form. They are, therefore, not only suited for many of the uses for which industrial refractories are required, including bricks, blocks, setter tile, muffles, kiln furniture, and special shapes for application in and around furnaces and other high temperature equipment, but they are also well suited for many specialty high temperature applications, such as jet engine combustion chambers, linings for exhaust nozzles, rocket combustion chambers and exhaust nozzles, turbine blades, stator blades, lens fusion blocks, and the like. They are also suitable for the fabrication of laboratory ware, including combustion boats, crucibles, burner holders, and other shapes.

The resistance of such bodies to chemical attack makes them highly suitable for the making of articles used in the containing, conveying and handling of many acids, alkalies and other corrosive chemicals, including such articles as chamber linings, crucibles, pipes and pipe fittings, jet pump linings, and other sundry shapes. The bodies of the present invention, particularly when modified by the use of pore formers in the raw batch from which the bodies are made, are also highly useful as diffusion and filtering media, such as diffusion tubes and plates, filtering tubes, plates and shapes, or as catalysts or catalyst carriers and supports.

Materials and articles of the present invention also can be made for abrasive purposes, such as grinding wheels, sharpening stones, razor hones, and other grinding and polishing shapes and materials. Other miscellaneous uses include their use as thread guides, wire drawing dies, sand blasting nozzles, heating elements, and the like. For example, electrical heating elements in rod form have been made in accordance with the present invention, which have operated at 1400° C. to provide a source of radiant heat.

Having thus described the invention it is desired to claim:

1. A refractory body consisting essentially of zirconium, boron and calcium, a predominant portion of the zirconium and boron being in the form of crystalline zirconium boride.

2. A refractory body composed of zirconium boride held in a matrix consisting essentially of oxidized zirconium and calcium.

3. A refractory article composed of zirconium boride and a calcium zirconate bond.

4. A refractory material consisting essentially of zirconium boride as the predominant constituent in a matrix of calcium zirconate.

5. A refractory article consisting essentially of zirconium boride held together in a matrix consisting essentially of zirconia and calcium oxide in solid solution.

6. A refractory shape consisting essentially of zirconium boride held together in an interstitial mass of zirconium oxide containing calcium oxide in solid solution.

7. A refractory body composed of crystalline zirconium boride in an interstitial mass of calcium zirconate.

8. A refractory body composed of 75% zirconium boride and 25% calcium zirconate.

9. A method of making bonded zirconium boride bodies which comprises forming a mixture consisting essentially of granular zirconium boride and finely divided calcium zirconate, molding an article of the desired shape from said mixture, and firing the molded article to a temperature of about 2000° C. in an inert atmosphere.

10. A method of making bonded zirconium boride bodies which comprises forming a mixture consisting essentially of granular zirconium boride and finely divided calcium zirconate, molding an article of the desired shape from said mixture, and firing the molded article to a temperature of about 2000° C. in an atmosphere of helium.

11. A method of making bonded zirconium boride bodies which comprises forming a mixture consisting essentially of calcium boride, zirconium oxide and carbon, molding an article of the desired shape from said mixture, and firing the molded article to a temperature of about 2000° C. in an inert atmosphere.

12. A method of making bonded zirconium boride bodies which comprises forming a mixture consisting essentially of about 25 parts by weight of calcium boride, 70 parts by weight of zirconium oxide, and 5 to 10 parts by weight of carbon, molding an article of the desired shape from said mixture, and firing the molded article to a temperature of about 2000° C. in an inert atmosphere.

13. A method of making bonded zirconium boride bodies which comprises forming a mixture consisting essentially of calcium boride, zirconium oxide and carbon, heating said mixture in an inert atmosphere to a temperature of about 2000° C., crushing the resulting mass to finely divided form, molding an article of the desired shape from the resulting crushed material, and firing the molded article to a temperature of around 2000° C. in an inert atmosphere.

14. A method of making bonded zirconium boride bodies which comprises forming a mixture consisting essentially of calcium borate, zirconium oxide and carbon, heating said mixture in an inert atmosphere to a temperature of about 2000° C., crushing the resulting mass to finely divided form, molding an article of the desired shape from the resulting crushed material, and firing the molded article to a temperature of around 2000° C. in an inert atmosphere.

15. A method of making bonded zirconium boride bodies which comprises forming a mixture consisting essentially of zirconium boride and calcium zirconate, heating said mixture in an inert atmosphere to a temperature of about 2000° C., crushing the resulting mass to finely divided form, molding an article of the desired shape from the resulting crushed material, and firing the molded article to a temperature of around 2000° C. in an inert atmosphere.

16. A method of making bonded zirconium boride bodies which comprises forming a mixture consisting essentially of zirconium boride and calcium zirconate, placing said mixture in a mold, and heating said mixture under pressure in an inert atmosphere to a temperature of about 2000° C. to form a strongly bonded article therefrom.

17. A method of making bonded zirconium boride bodies which comprises forming a mixture consisting essentially of calcium boride, zirconium oxide and carbon, placing said mixture in a mold, and heating said mixture under pressure in an inert atmosphere to a temperature of about 2000° C. to form a strongly bonded article therefrom.

18. A method of making bonded zirconium boride bodies which comprises forming a mixture consisting essentially of calcium borate, zirconium oxide and carbon, placing said mixture in a mold, and heating said mixture under pressure in an inert atmosphere to a temperature of about 2000° C. to form a strongly bonded article therefrom.

KENNETH C. NICHOLSON.

(No references cited.)